(12) United States Patent
Infante Aguirre et al.

(10) Patent No.: US 12,017,783 B2
(45) Date of Patent: Jun. 25, 2024

(54) AIRCRAFT WITH FOLDING MECHANISM

(71) Applicant: Volocopter GmbH, Bruchsal (DE)

(72) Inventors: Francisco Javier Infante Aguirre, Munich (DE); Michael Harms, Waldbronn (DE)

(73) Assignee: Volocopter GmbH, Bruchsal (DE)

( * ) Notice: Subject to any disclaimer, the term of this patent is extended or adjusted under 35 U.S.C. 154(b) by 132 days.

(21) Appl. No.: 17/731,344

(22) Filed: Apr. 28, 2022

(65) Prior Publication Data
US 2022/0348339 A1    Nov. 3, 2022

(30) Foreign Application Priority Data

Apr. 28, 2021 (EP) ..................................... 21170990

(51) Int. Cl.
*B64D 27/40* (2024.01)
*B64C 27/32* (2006.01)
(Continued)

(52) U.S. Cl.
CPC .............. *B64D 27/40* (2024.01); *B64C 27/32* (2013.01); *B64C 25/00* (2013.01); *B64C 29/0025* (2013.01); *B64D 27/24* (2013.01)

(58) Field of Classification Search
CPC .. B64C 1/063; B64C 1/30; B64C 3/56; B64C 29/0033; B64C 27/08; B64U 20/50; B64U 30/20; B64U 10/10; B64U 10/13
See application file for complete search history.

(56) References Cited

U.S. PATENT DOCUMENTS 3,053,480 A * 9/1962 Vanderlip ............ B64U 30/293
                                                    244/17.13
9,676,477 B1 * 6/2017 Kimchi ..................... B64C 1/30
(Continued)

FOREIGN PATENT DOCUMENTS

CN          106741912 A * 5/2017 ............... B64C 1/30
DE        202006017959      4/2007
(Continued)

OTHER PUBLICATIONS

Translation of CN 106741912 A (Year: 2017).*

*Primary Examiner* — Michael H Wang
*Assistant Examiner* — Colin Zohoori
(74) *Attorney, Agent, or Firm* — FIG. 1 Patents

(57) ABSTRACT

An aircraft with folding mechanism, the aircraft including a fuselage, optionally a payload and/or landing gear attached to the fuselage, at least two longitudinal beams attached to the fuselage that preferably extend parallel to each other and parallel to a first aircraft axis, with lifting units attached to each of the longitudinal beams. At least one crossbeam is attached to the fuselage, and preferably extending parallel to a second aircraft axis and at right angles with respect to the longitudinal beams, with lifting units attached to the crossbeam. The longitudinal beams are rotatably attached to the fuselage by at least one respective first pivot joint configured for pivoting the longitudinal beams around a respective first pivot axis to a pivoted position. The crossbeam is rotatably attached to the fuselage, preferably by at least one second pivot joint, for pivoting the crossbeam around a second pivot axis to a pivoted position.

16 Claims, 8 Drawing Sheets

(51) Int. Cl.
  *B64C 29/00*    (2006.01)
  *B64C 25/00*    (2006.01)
  *B64D 27/24*    (2024.01)

(56) References Cited

U.S. PATENT DOCUMENTS

| | | | |
|---|---|---|---|
| 10,745,102 B2 * | 8/2020 | Nysæter | B64C 39/024 |
| 10,793,270 B2 * | 10/2020 | Chen | B64U 20/50 |
| 10,870,478 B2 * | 12/2020 | Lee | B64C 27/08 |
| 11,518,489 B2 * | 12/2022 | Zhang | B64U 50/19 |
| 11,628,932 B2 * | 4/2023 | Seung | B64U 60/50 |
| | | | 244/17.23 |
| 2009/0008499 A1 | 1/2009 | Shaw | |
| 2019/0225335 A1 * | 7/2019 | Zhang | B32B 3/08 |
| 2020/0094960 A1 | 3/2020 | Wu et al. | |
| 2020/0130803 A1 * | 4/2020 | Xiao | B64U 10/14 |
| 2020/0361601 A1 | 11/2020 | Mikic et al. | |
| 2021/0107620 A1 | 4/2021 | Weekes et al. | |

FOREIGN PATENT DOCUMENTS

| | | |
|---|---|---|
| DE | 102012202698 | 8/2013 |
| WO | 2018038822 | 3/2018 |
| WO | 2019207558 | 10/2019 |
| WO | WO-2023035236 A1 * | 3/2023 |

* cited by examiner

AIRCRAFT WITH FOLDING MECHANISM

INCORPORATION BY REFERENCE

The following documents are incorporated herein by reference as if fully set forth: European Patent application No. 21 170 990.2, filed Apr. 28, 2021.

TECHNICAL FIELD

The invention relates to an aircraft with a folding mechanism, in particular to an eVTOL aircraft, i.e., an aircraft with a plurality of electrically powered lifting/propulsion units and with vertical take-off and landing capacity. Such aircraft are also commonly referred to as "multicopter".

BACKGROUND

DE 10 2012 202 698 A1 discloses an aircraft of the above-defined type that has branched arms on which are arranged lifting units in the form of electric motors with propellers (rotors). Said arms are attached to a central hub and can be dissembled or folded for storage or transport.

FIG. 1 shows a prior art aircraft of the above-defined type in a perspective view (top) and a plan view (bottom). In particular, FIG. 1 shows an aircraft 1 in the form of a multi-rotor eVTOL aircraft as produced by the applicant. Aircraft 1 comprises a fuselage 2 holding—inter alia—an onboard flight controller 2a for controlling a plurality of, e.g., 18 electrically powered propulsion or lifting units 3, each propulsion unit at least comprising an electric motor 3a and a (preferably monolithic) rotor 3b with corresponding rotor blades. For reason of clarity, only one propulsion (lifting) unit 3 and its components are explicitly denoted in FIG. 1. The propulsion units 3 are located on branched, Y-shaped arms 3c. Reference numeral 4 denotes an exemplary sensor unit for measuring a current state of aircraft 1 and/or of propulsion unit 3. Reference numeral 5 denotes connecting elements for interconnecting neighbouring arms 3c. The arms 3c are attached to a central hub 6. Sensor unit 4 and propulsion units 3 are operatively connected in communication with flight controller 2a, as depicted. Reference numerals x, y, and z denote the aircraft's main control axes, i.e., roll (longitudinal), pitch (transverse), and yaw (vertical). Corresponding moments are denoted L, M, and N.

Existing folding and rotating mechanisms as known, e.g., from prior art document DE 20 2006 017 959 U1, require heavy additional devices that need to be carried during flight and are thus limiting the flying range and/or the payload.

A light-weight and easily handleable folding mechanism (preferably operable by one person only) would be favourable for the application as a heavy-duty drone, e.g., for agricultural applications, applications on construction sites, or logistics, where the aircraft/drone is usually transported to the respective site, assembled, used, disassembled, and then stored on a trailer. However, the folding and rotation mechanism used in known aircraft require a high amount of caution to use them in the right direction. Furthermore, the mechanisms often comprise fragile longitudinal beams, and a complex fixture on ground is required to fix the fragile longitudinal beams. Also, complex fixtures may be required for fixing the beams to the floor.

This can make it difficult or cumbersome to move the folded drone onto a trailer for transport. Landing on a trailer or moving the rigged drone is required before de-rigging.

From a load path perspective, the major load transfer from side to side and from front and aft in current version of known eVTOL aircraft in their flight configuration is via the central hub, thus adding high interface loads resulting in wear and tear in any connector elements involved (e.g., bolts, bushings, etc.).

SUMMARY

It is the object of the present invention to overcome the above-mentioned disadvantages and to provide an aircraft with folding mechanism that has increased durability and stability while having reduced weight.

The object is achieved by an aircraft having one or more of the features disclosed herein. Advantageous further embodiments are defined below and in the claims.

According to the invention, an aircraft, particularly an eVTOL aircraft, with folding mechanism comprises: a fuselage, which may comprise a payload bay; optionally a payload and/or a landing gear attached to said fuselage, preferably below said fuselage; at least two longitudinal beams attached to said fuselage, preferably above and/or sideways of said fuselage, that preferably extend parallel to each other and parallel to a first axis of the aircraft, with a plurality of lifting units attached to each of said longitudinal beams; at least one crossbeam attached to said fuselage, preferably above said fuselage, and extending parallel to a second axis of the aircraft and preferably at right angles with respect to said longitudinal beams (if said longitudinal beams are parallel to each other and parallel to said first axis of the aircraft), with a plurality of lifting units attached to said crossbeam; wherein said longitudinal beams are rotatably attached to said fuselage by means of at least one respective first pivot joint devised for pivoting said longitudinal beams around a respective first pivot axis to a pivoted position; and wherein said crossbeam is rotatably attached to said fuselage, preferably by means of at least one second pivot joint, for pivoting said crossbeam around a second pivot axis to a pivoted position.

Said first axis can be a longitudinal axis of the aircraft, while said second axis can be a transverse axis of the aircraft, which is preferred. However, said axes could also be interchanged.

Said first pivot axis can be parallel to said longitudinal axis of the aircraft, while said second pivot axis can be parallel to a vertical axis of said aircraft, which is a preferred configuration.

It is possible to follow the basic design principle disclosed in the present description without using a crossbeam, although the use of such crossbeam is preferable in terms of stability. However, it would be a viable modification of the present disclosure to devise an aircraft without such crossbeam.

Whereas the prior art comprised a central hub structure incorporating the sliding and rotational mechanism, with said arms or rotor beams mounted to the central hub, the new design has at least two, preferably identical (i.e., mirrored or flipped) longitudinal rotor beams as well as a crossbeam, but no central hub. The crossbeam extends parallel to a transverse axis of the aircraft at right angles with respect to said longitudinal beams. The longitudinal beams and the crossbeam are also referred to as "rotor beams". As before, said rotor beams can be interconnected using ring connectors (connector elements) for increased stability.

Load paths from left to right and from forward to aft is achieved via said longitudinal beams and/or said crossbeam, and the interface loads to the fuselage are resulting from (combined) weight of payload (optional) and fuselage.

There is no need to transfer any flight loads via the fuselage to the other side of the rotor plane.

Possible features and advantages of the proposed structural concept for a foldable structure for a (large) multicopter may include

- ring connectors (connection elements) that fold inwards and can be locked to other beams;
- longitudinal beams that fold downwards;
- crossbeam rotation to the front and locking in that position;
- no disconnect of cables required during transport;
- no major component to be removed for transport;
- all connections may use quick release fasteners, and no tools are required for rigging;
- length, width and height of the folded system (aircraft) allow container shipping (e.g., in 40 ft container) and allow conventional street transportation.

The invention is not limited to an aircraft with any particular number of lifting units, although examples include multicopter with 18 motors (N=18), hexacopter (N=6), and octocopter (N=8). Other configurations can be realized as well.

The following terminology is used in the present description: "Longitudinal beam" refers to a beam for motor installation usually from front to rear of the multicopter (preferably parallel to x-axis, cf. FIG. 1). Such beams are preferably folded (pivoted) downwards. "Crossbeam" refers to a beam for motor installation usually from left to right (transverse direction, y-axis in FIG. 1). It is preferably rotated by 90° during folding. "Ring connectors" or "connection elements" refers to structural interconnection beams between rotor beams. They may be used for larger multicopter in order to increase stability, but they are not mandatory.

In an embodiment of the aircraft according to the invention, said lifting units comprise at least one respective rotor, said rotors being arranged in a common rotor plane, at least for said longitudinal beams and/or for said crossbeam, respectively. Said rotor plane can be different between said longitudinal beams on the one hand and said crossbeam on the other hand. Individual rotors can be inclined with respect to said planes.

In a particular embodiment of the aircraft according to the invention, said crossbeam is arranged above said longitudinal beams along a vertical axis of the aircraft (z-axis in FIG. 1).

In another embodiment of the aircraft according to the invention, said longitudinal beams have multiple branches, said lifting units being located at respective branching points and/or at end-points of said branches. Preferably, two times three lifting units are arranged on a given beam, which may have a (doubly) Y-shaped configuration, and the lifting units arranged on a common branch are arranged in at least one triangular configuration.

In yet another embodiment of the aircraft according to the invention, said crossbeam has multiple branches, said lifting units being located at respective branching points and/or end-points of said branches, preferably in at least one triangular configuration. Again, the crossbeam can have a (doubly) Y-shaped configuration, and the lifting units arranged on a common branch are arranged in at least one triangular configuration.

In yet another embodiment of the aircraft according to the invention, any rotors comprised in said lifting units can be attachable for transport in rotational position relative to said longitudinal beams and said crossbeam, respectively. This can be achieved by means of a strap system, dedicated protection attachments, dust covers or the like.

In an advantageous further embodiment of the aircraft according to the invention, the rotors located on said longitudinal beams are attachable (for transport) with their blades oriented in parallel with said longitudinal beams, whereas the rotors located on said crossbeam are attachable (for transport) with their blades oriented in parallel with said crossbeam, transversely to said longitudinal beams. This facilitates the folding operation while protecting the rotor blades. Furthermore, this guarantees that the rotors do not hit the ground during folding. In this context, attachable" means that the rotors can be attached or fixed to the beams, so that they do not move during folding and/or transport.

In yet another embodiment of the invention, the aircraft comprises a plurality of connector elements for interconnecting, by means of each one of said connector elements, one of said longitudinal beams with said crossbeam or one of said longitudinal beams with another one of said longitudinal beams. These connector elements ("ring connectors") have been mentioned earlier. They provide enhanced structural stability, especially in larger multicopters (e.g., N≥8).

In a particularly advantageous further embodiment of the aircraft according to the invention, a given connector element is rotatably attached either to one of said longitudinal beams or to said crossbeam by means of a third pivot joint devised for rotating said connector element against said one of said longitudinal beams or said crossbeam. In this way, it can simply be folded in as a first step when folding the aircraft.

In a corresponding further embodiment, the aircraft may comprise a quick release mechanism for securing said connector elements on said crossbeam, said quick release mechanism preferably comprising a pin for passing through alignable through-holes in said connector elements and said crossbeam, respectively, more preferably for passing through alignable through-holes in said connector elements and in respective brackets attached to said crossbeam. This facilitates the folding-in operation of said connector elements. Said brackets can be used to accommodate for a difference in height between crossbeam and longitudinal beams.

In particular, rotation interfaces comprised in said quick release mechanism can be carried out as bolts (or pins) secured with a nut or the like and are considered to be free for rotation around the z-axis (or an axis parallel to the z-axis; cf. FIG. 1) to swivel freely as soon as the above-described quick release interface is unlocked.

While said quick release interface can be a bolt secured by a nut, a quick release solution comprising, e.g., a quarter turn bolt or pin/cotter pin combination may be preferred.

After folding in the ring connectors, they may advantageously be secured to the rotor beams for transport, and the aircraft may comprise corresponding securing mechanisms.

As the vertical location of the crossbeam can be different from a vertical location of the longitudinal beams, a bracket (mentioned earlier) can be used on the crossbeam in order to allow the use of identical ring connectors.

During folding, any quick release pins (or equivalent) must be opened to release the longitudinal beams, and then the longitudinal beams can be folded downwards. The quick release mechanism for the longitudinal beams can be combined with the release system of the crossbeam, thus reducing weight.

Any substructure for holding the longitudinal beams is ideally transferring the corresponding loads directly into a bulkhead of the fuselage that is directly connected to the (optional) landing gear and to any cargo mounting hardware (e.g., brackets for attaching a payload). This will result in an optimized load path.

In yet another embodiment of the aircraft according to the invention, said aircraft comprises electrical connectors, e.g., cables, between said fuselage and said lifting units, wherein said electrical connectors have sufficient slack length in a vicinity of said first and/or second pivot joints for pivoting said longitudinal beams and said crossbeam, respectively, without the necessity of detaching said electrical connectors during folding. The same applies to any electrical connectors used with sensors or other electrical equipment deployed on the rotor beams. Cable routing is done in such a way that no disconnecting during folding is required.

In another embodiment of the aircraft according to the invention, said longitudinal beams, in a pivoted position thereof, enclose said fuselage and optionally a landing gear and/or payload attached to said fuselage. While this may help to protect fuselage and/or payload/landing, it also provides an advantageous configuration with minimum spatial extension.

If the aircraft comprises a payload bay, as mentioned above, the payload can be located therein during transport.

The folding downward can be supported by a gas spring or the like to allow single person operation. The gas spring can be either part of the aircraft or—preferably—can be devised as a separate item for rigging, so that it does not add any weight to the aircraft during flight.

In a corresponding embodiment of the aircraft according to the invention, the aircraft comprises a resilient mechanism, e.g., a respective gas spring, devised to support a pivoting motion of said longitudinal beams, preferably in the form of a detachable mechanism. This may further facilitate the folding operation, in particular if it is performed be a single person.

In another embodiment of the aircraft according to the invention, the aircraft comprises a detachable crossbeam jig that provides said second pivot joint. Since said jig is detachable, it does not add to the aircraft's weight during flight.

In another embodiment of the aircraft according to the invention, the aircraft comprises fixing means for fixing said crossbeam to said longitudinal beams in said pivoted positions. This provides additional security during transport.

As stated before, the aircraft according to the invention may comprise N=6, N=8 or N=18 lifting units, without limitation, each with at least one rotor. Generally speaking, the aircraft may comprise any even number of lifting units N=2k, with k∈N, preferably N=6, N=8 or N=18, wherein: for N=6, two lifting units are arranged on said crossbeam, at opposite ends thereof, and two lifting units are arranged on each one of two longitudinal beams, at opposite ends thereof; for N=8, four lifting units are arranged on said crossbeam, preferably at respective branching points and/or end-points of said branches thereof, and two lifting units are arranged on each one of two longitudinal beams, at opposite ends thereof; for N=18, six lifting units are arranged on said crossbeam, preferably at respective branching points and/or end-points of said branches thereof, and six lifting units are arranged on each one of two longitudinal beams, preferably at respective branching points and/or end-points of said branches thereof.

To finish the folding operation, said crossbeam, which has been released from the longitudinal beams, is rotated about the vertical z-axis (cf. FIG. 1) through 90° to the front. The corresponding pivot point (or pivot joint) can either be a fixedly installed rotation point on the fuselage or, preferably, can be devised as a jig that is installed for rigging/de-rigging only in order not to add weight to the aircraft during flight.

After rotating the crossbeam, the corners thereof are preferably fixed to the longitudinal beams in order to stabilize the structure and to stiffen out the structure during transport. For that purpose, the existing mounting locations of the ring connectors can be used advantageously.

The crossbeam can be rotated manually without using a dedicated pivot point (or pivot joint) in the center of the aircraft. Although this will require two people, it may be beneficial as no rotational pivot system with additional weight is required.

BRIEF DESCRIPTION FO THE DRAWINGS

Additional features and advantages of the invention will become apparent from the following description of preferred embodiments with reference to the appended drawings.

DETAILED DESCRIPTION

Figure 1:
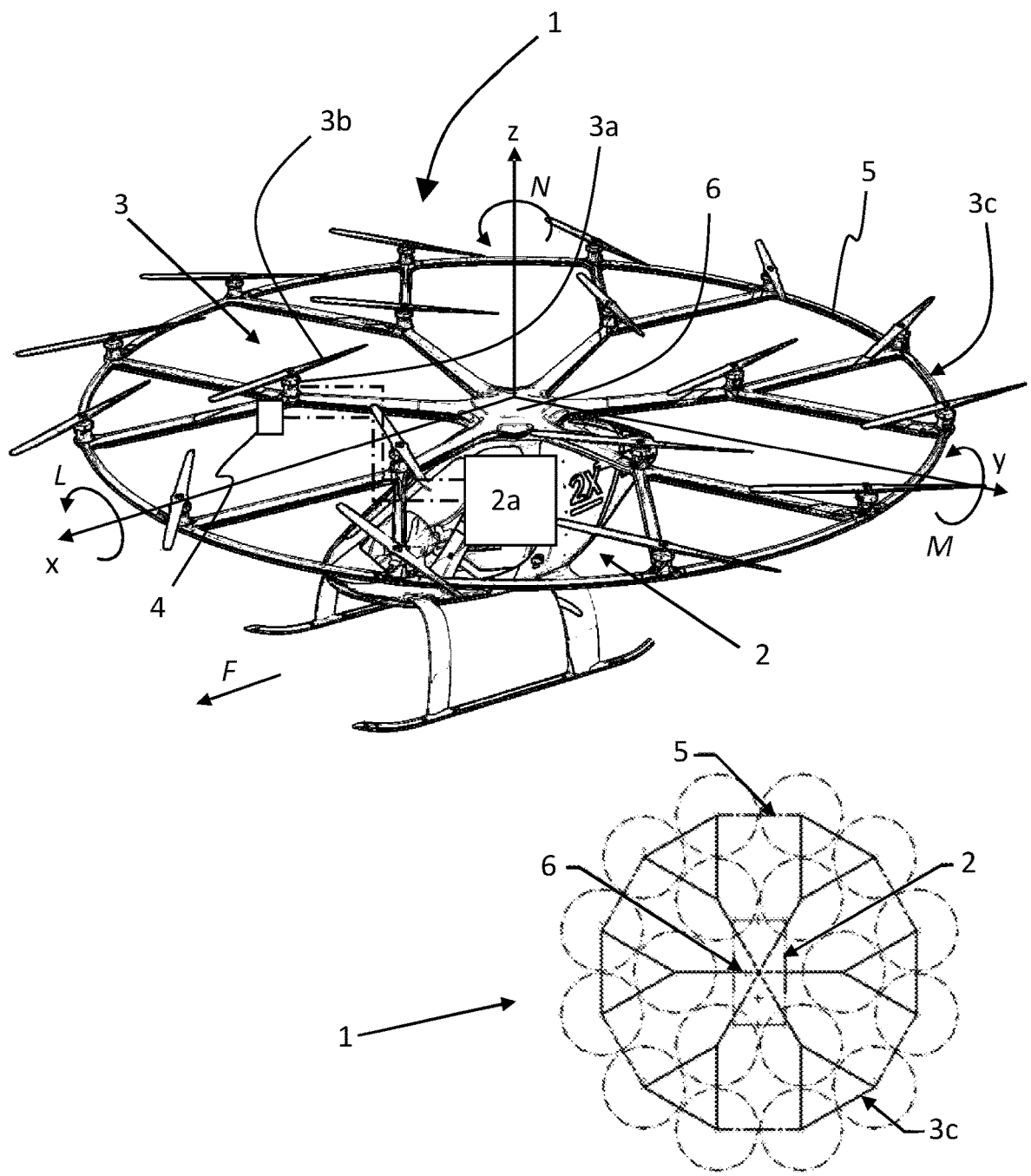
FIG. 1 shows a prior art aircraft configuration.

FIG. 1 has been described further up; it shows a prior art aircraft 1.

In the following Figures, same reference numerals denote the same elements or elements that do at least provide a similar function. In the case of identical elements, not all of them are provided with a reference numeral for increased intelligibility.

Figure 2:
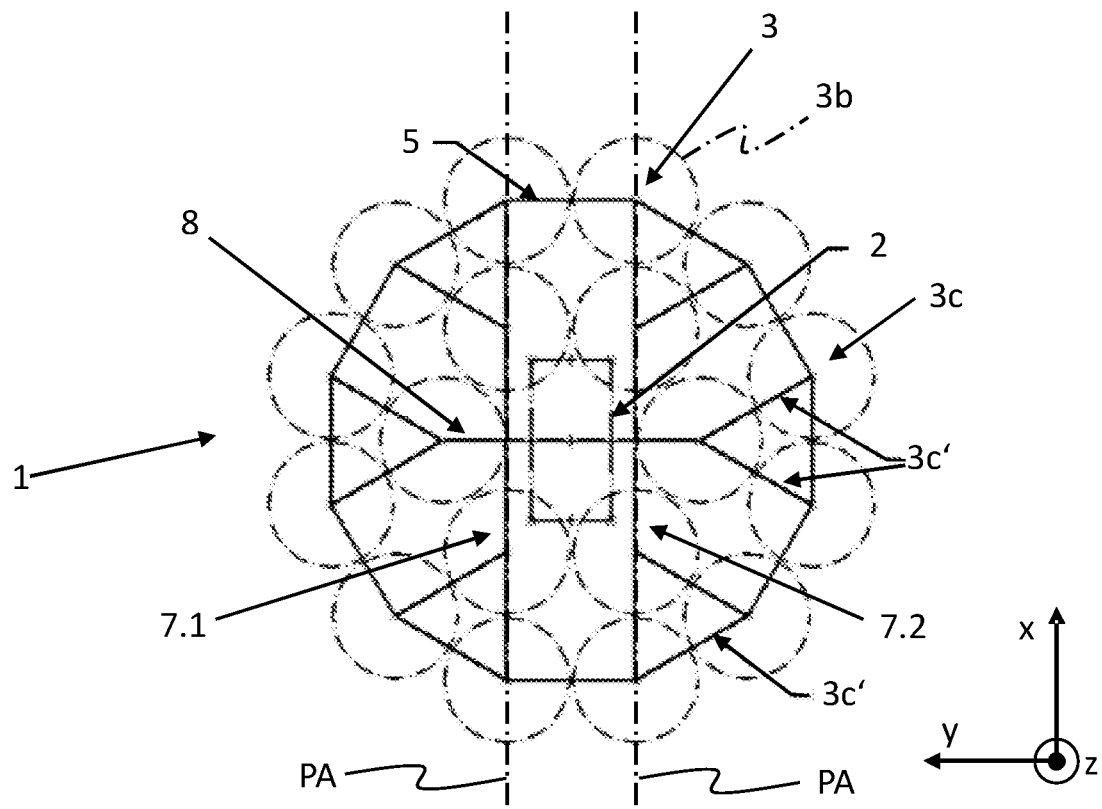
FIG. 2 shows a schematical representation of an aircraft according to the invention.

FIG. 2 schematically shows the new aircraft design without a central hub. Aircraft 1 comprises a fuselage 2, under which can be attached a payload and/or a landing gear (cf. FIG. 12). Aircraft 1 further has at least two longitudinal beams 7.1, 7.2 attached to said fuselage 2, preferably above and sideways of said fuselage 2, as shown. Said longitudinal beams 7.1, 7.2 extend parallel to each other and parallel to a longitudinal axis of the aircraft (denoted x in FIG. 2). There is a plurality of lifting units 3 attached to each of said longitudinal beams 7.1, 7.2, only one of which is denoted by means of reference numerals 3, 3b (wherein 3b indicates a corresponding rotor by means of a corresponding propeller sweep area). Each lifting unit is thus symbolized by a dashed circle in FIG. 2. All of the rotors 3b located on the longitudinal beam 7.1, 7.2 can be arranged in a common rotor plane.

At least one crossbeam 8 is also attached to said fuselage 2, preferably above said fuselage 2 and above said longitudinal beams 7.1, 7.2, and it extends parallel to a transverse axis of the aircraft 1 (denoted y in FIG. 2) at right angles with respect to said longitudinal beams 7.1, 7.2. A plurality of lifting units is attached to said crossbeam 8, as shown. All of the rotors 3*b* located on the crossbeam 8 can be arranged in a common rotor plane, which rotor plane can be (but need not be) the same as for the rotors located on said longitudinal beams 7.1, 7.2. Said longitudinal beams 7.1, 7.2 are rotatably attached to said fuselage 2 by means of at least one respective first pivot joint (cf. FIG. 8) devised for pivoting said longitudinal beams 7.1, 7.2 around a respective first pivot axis to a pivoted position, which first pivot axis is parallel to said longitudinal axis (x). Furthermore, said crossbeam 8 is rotatably attached to said fuselage 2, preferably by means of at least one second pivot joint (cf. FIG. 10), for pivoting said crossbeam 8 around a second pivot axis to a pivoted position, which second pivot axis is parallel to a vertical axis (z) of aircraft 1.

Both the longitudinal beams 7.1, 7.2 and the crossbeam 8 have a branched configuration and are shaped in the form of the letter "Y" towards their respective free ends (i.e., away from the fuselage 2). Furthermore, there are additional branches that connect the upper Y legs, thus creating a triangular beam configuration at the extremities of the longitudinal beams 7.1, 7.2 and the crossbeam 8. In analogy with FIG. 1, individual branches or beams of the Y-shaped beam portions 3*c* are denoted by reference numerals 3*c'*, which encompasses those beams that interconnect the upper extremities of the Y legs. However, there is no central hub in FIG. 2, and every beam, i.e., longitudinal beams 7.1, 7.2 and crossbeam 8, comprises two Y-shaped portions 3*c* at its extremities. The lifting units 3 are located in the corners (apexes) of said triangular beam configurations. As in the prior art, elements 5 (ring connectors or connector elements) interconnect neighbouring Y-shaped beam portions 3*c* to form an overall ring-shaped configuration for increased stability.

While crossbeam 8, in the embodiment shown, is perfectly symmetric with respect to its longitudinal axis (from free end to free end, i.e., left to right along axis y in FIG. 2), the longitudinal beams 7.1, 7.2 are of asymmetrical configuration in this respect, as can be seen from FIG. 2. In fact, they are devised as identical parts and arranged symmetrically with respect to a middle transverse axis (parallel to crossbeam 8). They are further arranged in mutually mirrored fashion (with respect to a longitudinal axis of the aircraft 1; cf. axis x in FIG. 2).

Preferably, pivot axes for (downward) folding of said longitudinal beams 7.1, 7.2 are arranged parallel to an axis of longest straight extension of said longitudinal beams 7.1, 7.2. These pivot axes are depicted by means of dash-dotted lines PA in FIG. 2. This is advantageous since it permits to fold down said longitudinal beams 7.1, 7.2 without having any rotor 3*b* extend upwardly beyond a plane defined by said pivot axes PA. This will become clearer further down (cf., e.g., FIGS. 8 and 12).

Figure 3:
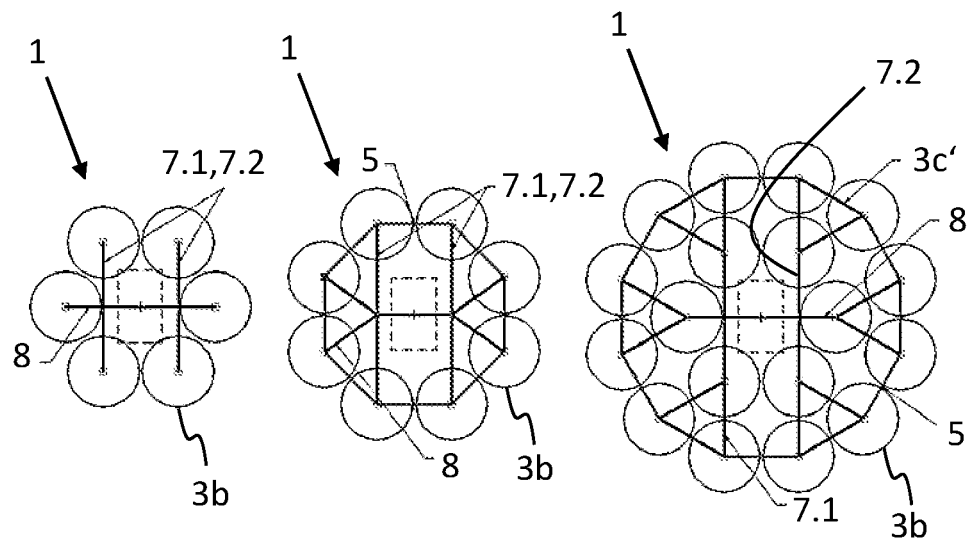
FIG. 3 shows different aircraft configurations according to the invention.

FIG. 3 illustrates this basic design principle for aircraft 1 with (from left to right) six, eight, and eighteen lifting units 3, respectively.

Figure 4:
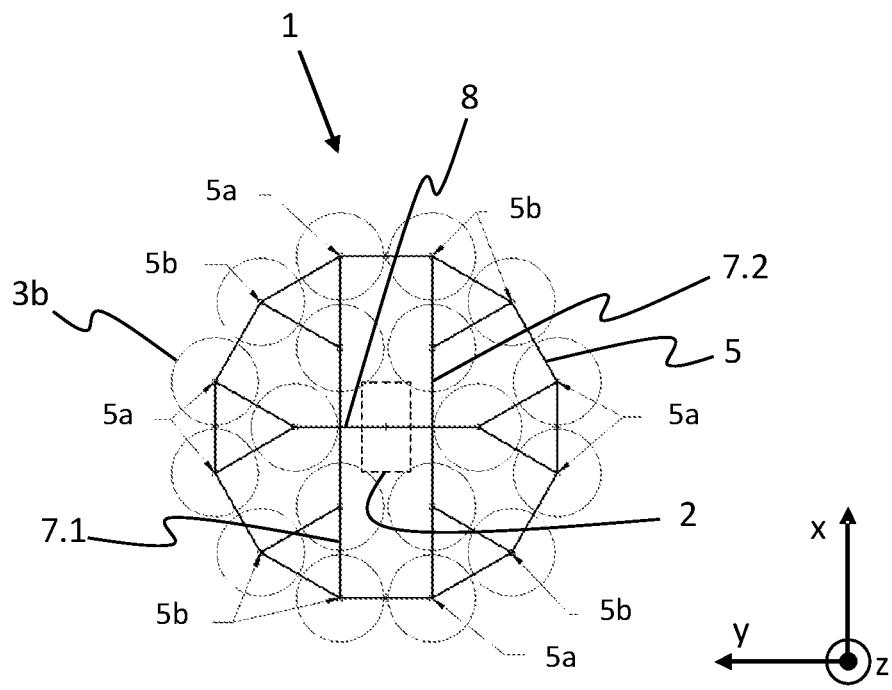
FIG. 4 shows the location of quick release and rotation interface in the aircraft of FIG. 2.
Figure 5:
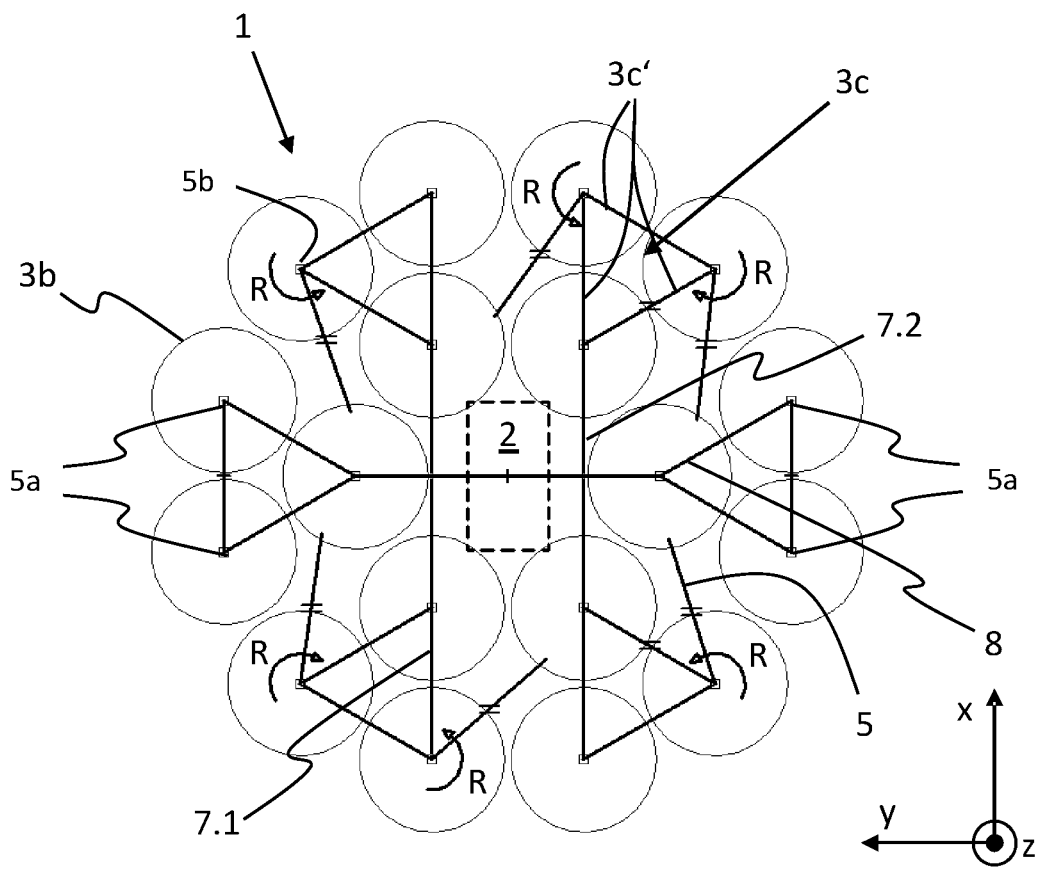
FIG. 5 shows a first step during folding the ring connectors of the aircraft of FIG. 2.

FIG. 4 shows the aircraft 1 of FIG. 2 and the location of quick release interfaces 5*a* as well as of rotation interfaces (or pivot joints) 5*b* in connection with the ring connectors 5. Upon release of the respective quick release interfaces 5*a*, said ring connectors 5 can be rotated around said rotation interfaces 5*b* as shown by arrows R in FIG. 5. The ring connectors 5 are thus placed against the Y-shaped beam portions or branches 3*c'*, where they can be attached for transport, as described above.

Figure 6:
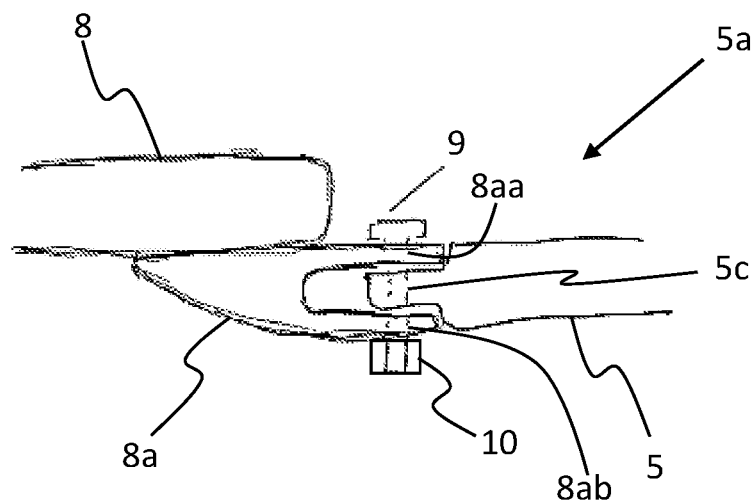
FIG. 6 shows an embodiment of the quick release mechanism for ring connector elements.

FIG. 6 provides details on a possible embodiment of said quick release interfaces 5*a*. Crossbeam 8 is preferably provided with a bracket 8*a*, which may compensate for different vertical positions (heights) of crossbeam 8 and longitudinal beams (not shown). Bracket 8*a* and ring connector 5 have alignable through-holes 8*aa*, 8*ab*, 5*c*, through which passes a cotter pin or a pin (bolt) 9 secured by a nut 10.

Figure 7:
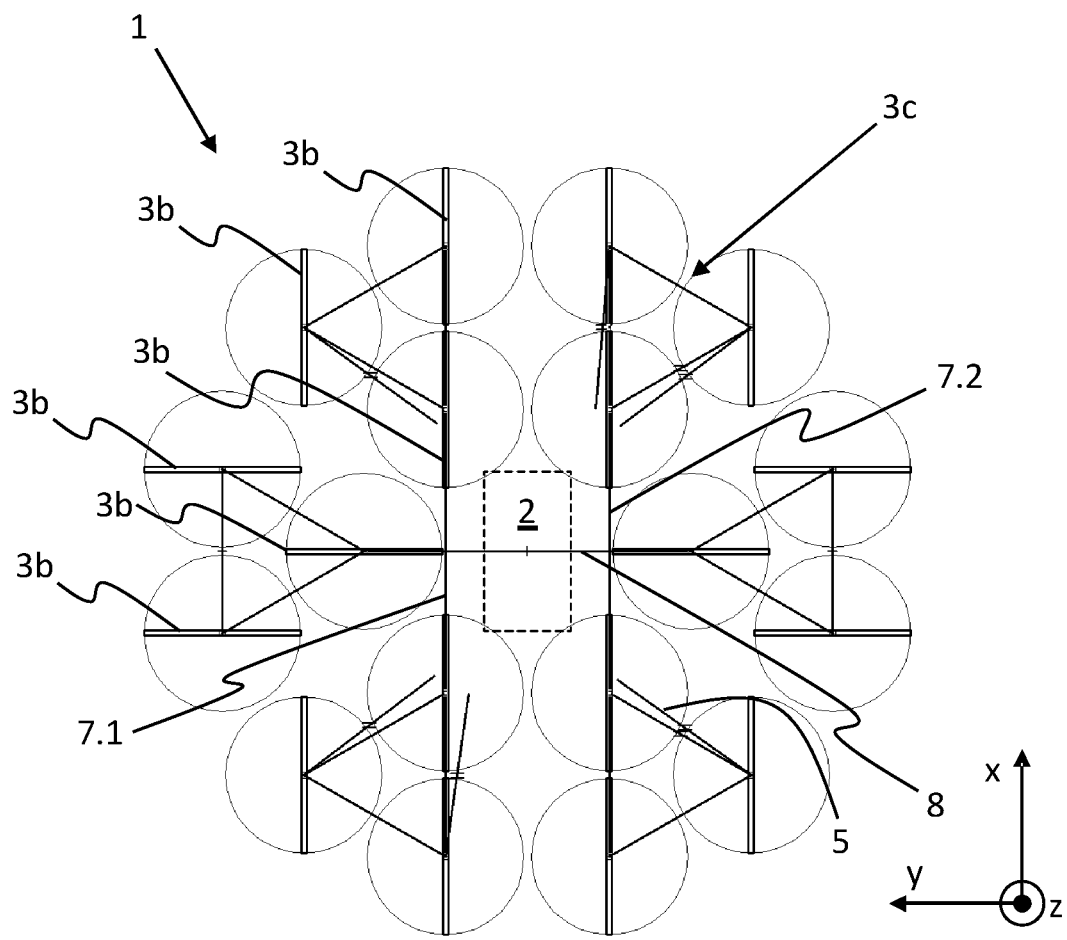
FIG. 7 shows a second step during folding of the aircraft of FIG. 2.

FIG. 7 shows a second step for pre-positioning of the rotors 3*b* during folding of the aircraft 1. The rotors 3*b* have been oriented (and secured, preferably) so that they point, with their respective blade axis, in the longitudinal direction x for those rotors 3*b* located on the longitudinal beams 7.1, 7.2, whereas the rotors 3*b* are oriented so that they point in the transverse direction y for those rotors 3*b* located on the crossbeam 8. Alternatively, the rotors could be dismounted prior to said second step.

Figure 8:
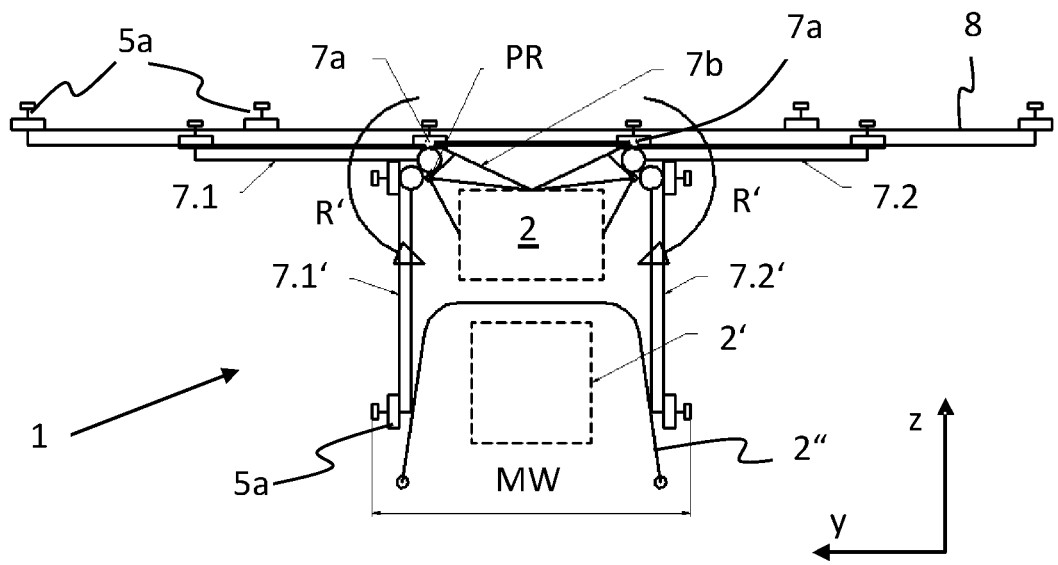
FIG. 8 shows the aircraft of FIG. 2 with folded longitudinal beams (third step during folding of the aircraft)

Then, in a third step according to FIG. 8, the longitudinal beams 7.1, 7.2 are folded downwards, as shown by arrows R'. Reference numeral 7*a* denotes a (quick) release mechanism for the longitudinal beam 7.1 that has to be operated before rotation R' can be performed. The same holds for longitudinal beam 7.2. Release mechanism 7*a* can be devised as shown in FIG. 6 for release mechanism 5*a*. For rotation, longitudinal beams 7.1, 7.2 are fixed to a respective point of rotation or pivot joint PR (shown only on one side) that is attached to the fuselage 2 by means of a support structure 7*b*. Thus, a corresponding pivot axis is parallel to the aircraft's longitudinal axis (cf. axes PA in FIG. 2). Reference numerals 7.1', 7.2' denote the longitudinal beams after rotation.

The other release mechanisms 5*a* shown in FIG. 8 can be those that were mentioned earlier in connection with FIGS. 4 and 6 (for releasing the ring connectors 5). Some of them, i.e., those located on the longitudinal beams 7.1, 7.2, can be re-used to fix the folded longitudinal beams 7.1', 7.2' to a landing gear 2" located below fuselage 2 (and optional payload 2'). To this end, the landing gear 2" can have suitable fixing structures (not shown). Landing gear 2" (and the aforementioned release mechanisms 5*a*) define a maximum width MW of the folded aircraft 1 for transport purposes.

The aircraft 1 may comprise a resilient mechanism, e.g., a respective gas spring, devised to support a pivoting motion of said longitudinal beams 7.1, 7.2, preferably in the form of a detachable mechanism. This is not shown in the Figures.

Figure 9:
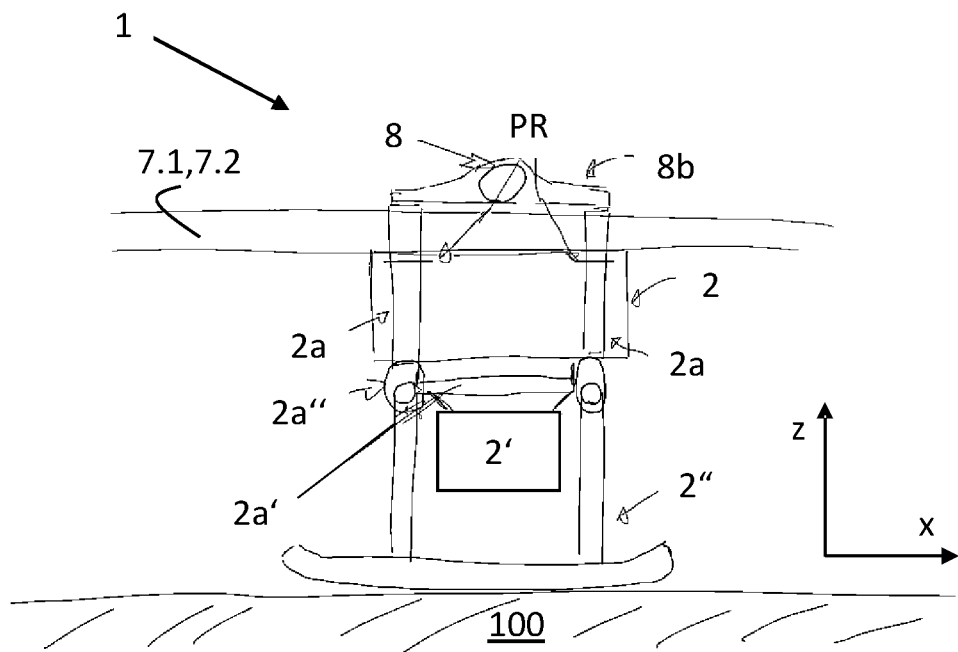
FIG. 9 shows details of the aircraft structure.

FIG. 9 shows further structural details of the aircraft 1. Reference numeral 8*b* denotes a crossbeam mount which serves to securely attach crossbeam 8 to a main fuselage bulkhead 2*a*. Further shown are landing gear brackets 2*a"* for attaching landing gear 2" to fuselage 2 (or bulkhead 2*a*) and payload mounting brackets 2*a'* for attaching payload 2' to fuselage 2 (or bulkhead 2*a* or landing gear 2"). Reference numeral 100 denotes the ground.

Figure 10:
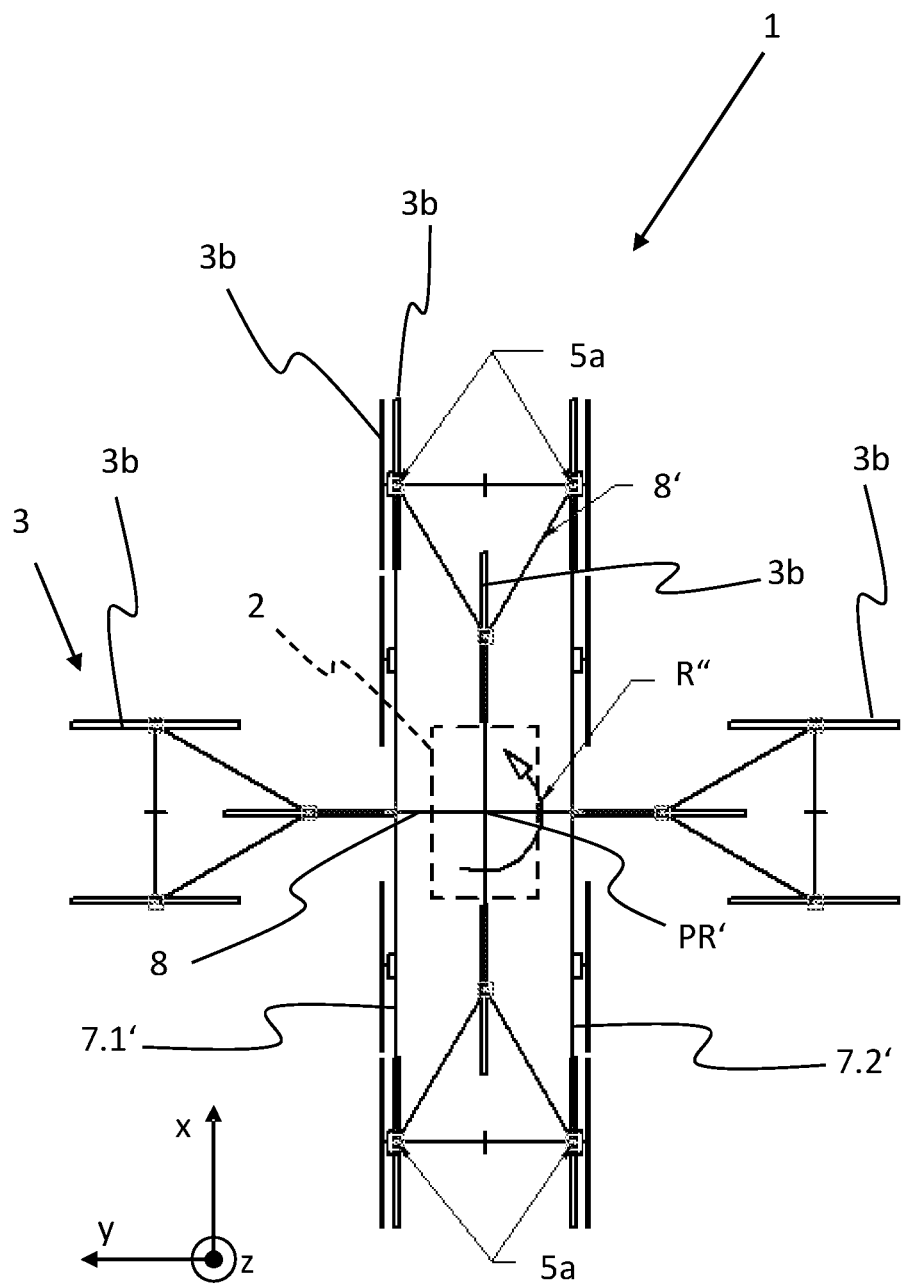
FIG. 10 shows a fourth step during folding of the aircraft of FIG. 2.

FIG. 10 shows the next (fourth) step during folding of the aircraft 1, similar to the drawing in FIG. 7, but with the longitudinal beams already in their downwardly rotated positions (cf. FIG. 8). Crossbeam 8 is rotated according to arrow R" into the longitudinal direction x to its new position denoted 8'. This can be achieved, depending on the nature of crossbeam mount 8*b* (FIG. 9), by releasing the crossbeam 8 and then rotating around a point of rotation PR', which can be a fixed pivot joint. However, embodiments without such joint are possible and have been described further up. In particular, aircraft 1 may comprise a detachable crossbeam jig (not shown) that temporarily provides said pivot joint for rotation R". Rotation R" is around a pivot axis which is parallel to the aircraft's vertical axis (z).

At reference numeral 5a, release mechanisms on crossbeam 8 can be re-used to provide interconnection between rotated crossbeam 8' and (rotated) longitudinal beams 7.1', 7.2' for transport purposes. However, dedicated additional mechanisms (not shown) could be provided as well.

Figure 11:
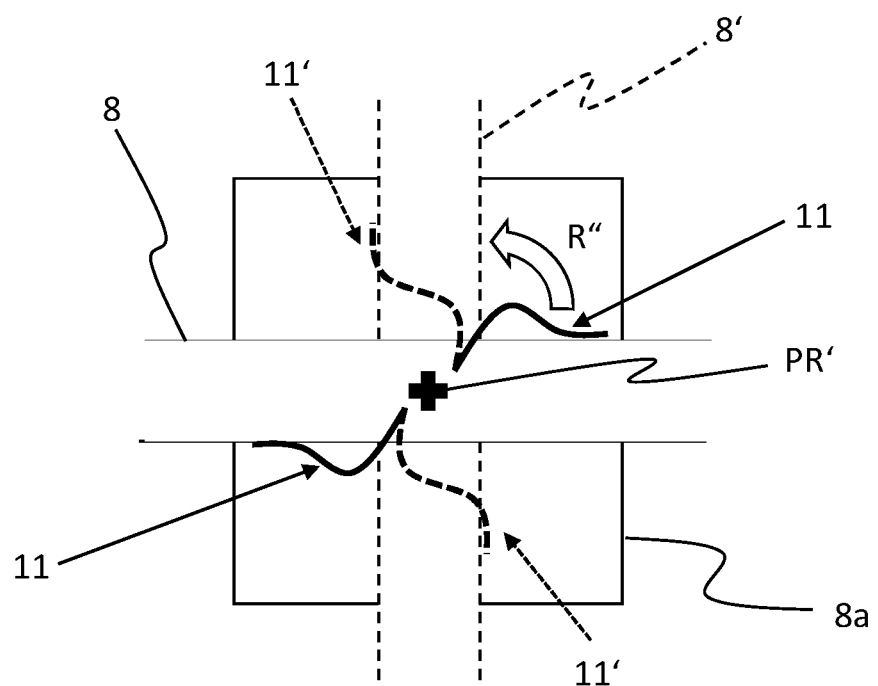
FIG. 11 shows a detail of the aircraft cable routing.

FIG. 11 comprises a detail from said last step, wherein electrical cables 11 are shown that pass along (or within) crossbeam 8 and then enter the fuselage (not shown) through mount 8a (cf. FIG. 9). Said cables can provide electrical energy to the rotors and/or signal connection with sensors or other equipment etc. (cf. FIG. 1). Cables 11 have sufficient (slack) length to avoid rupture and/or disconnection when rotating crossbeam 8 into its rotated position 8'. Reference numerals 11' denote said cables after crossbeam rotation.

Figure 12:
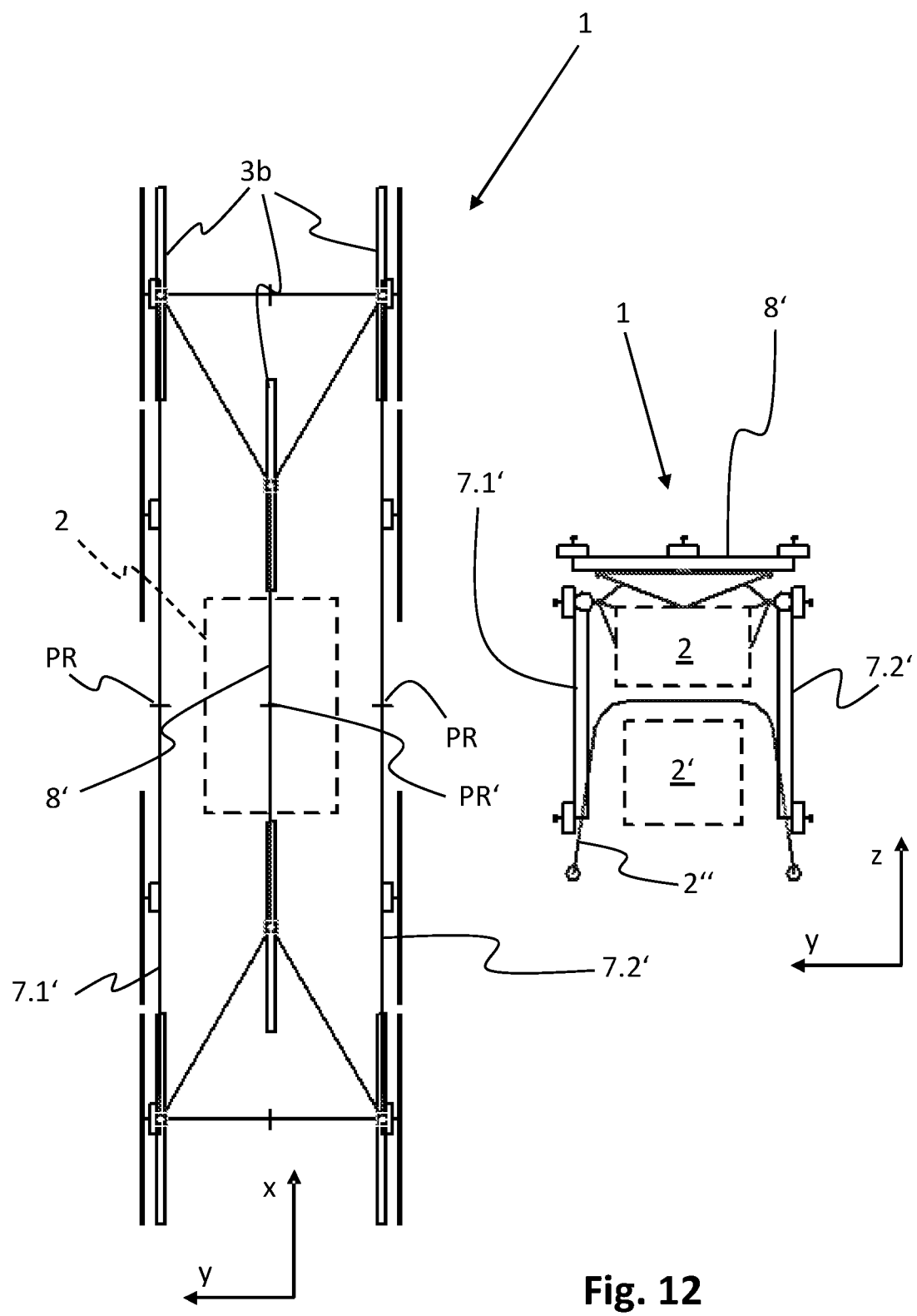
FIG. 12 shows a final folding state of the aircraft of FIG. 2.

FIG. 12 shows the final folded configuration of aircraft 1, as explained in detail above. On the left-hand side, aircraft 1 is shown in a plan view from above. On the right-hand side, aircraft 1 is shown in a frontal view. Advantageously, maximum width and length are such that the folded aircraft 1 can fit into a standard 40 ft container for shipping.

The invention claimed is:

1. An aircraft with a folding mechanism, the aircraft comprising:
   a fuselage;
   multiple longitudinal beams attached to the fuselage with multiple lifting units attached to each of the longitudinal beams, the longitudinal beams extending parallel to one another, extending parallel to a first axis of the aircraft, and being offset from one another in a direction perpendicular to the first axis in a locked configuration for flights, the longitudinal beams being rotatably attached to the fuselage by at least one respective first pivot joint that is configured to pivot the longitudinal beams around a respective first pivot axis to a pivoted position, wherein the respective first pivot axis is parallel to the first axis of the aircraft; and
   a crossbeam attached to the fuselage that extends at a right angle with respect to the longitudinal beams in the locked configuration for flights, with multiple other lifting units being attached to the crossbeam, the crossbeam being rotatably attached to the fuselage by at least one second pivot joint that is configured to pivot the crossbeam around a second pivot axis to a pivoted position.

2. The aircraft of claim 1, wherein said lifting units comprise at least one respective rotor, said rotors being arranged in a common rotor plane, for at least one of said longitudinal beams or said crossbeam, respectively.

3. The aircraft of claim 1, wherein said crossbeam is arranged above said longitudinal beams along a vertical axis of the aircraft.

4. The aircraft of claim 1, wherein said longitudinal beams have multiple branches, said lifting units being located at least at one of respective branching points or end-points of said branches.

5. The aircraft of claim 4, wherein the lifting units are located in at least one triangular configuration.

6. The aircraft of claim 1, wherein said crossbeam has multiple branches, said lifting units-being located at least at one of respective branching points or end-points of said branches.

7. The aircraft of claim 6, wherein the lifting units are located in at least one triangular configuration.

8. The aircraft of claim 1, wherein the lifting units comprise rotors attached to said longitudinal beams and said crossbeam in a pivoted position relative to said longitudinal beams and said crossbeam, respectively.

9. The aircraft of claim 8, wherein the rotors located on said longitudinal beams are attachable with their blades oriented in parallel with said longitudinal beams, and the rotors located on said crossbeam are attachable with their blades oriented in parallel with said crossbeam, transversely to said longitudinal beams.

10. The aircraft of claim 1, further comprising a plurality of connector elements for interconnecting one of said longitudinal beams with said crossbeam or one of said longitudinal beams with another one of said longitudinal beams.

11. The aircraft of claim 10, wherein at least one said connector element is rotatably attached either to one of said longitudinal beams or to said crossbeam by a third pivot joint configured for rotating said connector element against said one of said longitudinal beams or said crossbeam.

12. The aircraft of claim 11, further comprising a quick release mechanism configured to secure said connector elements on said crossbeam, said quick release mechanism comprising a pin for passing through alignable throughholes in said connector elements and said crossbeam or respective brackets attached to said crossbeam.

13. The aircraft of claim 1, wherein said longitudinal beams, in a pivoted position thereof, enclose said fuselage.

14. The aircraft of claim 1, further comprising an attachment configured to fix said crossbeam to said longitudinal beams in said pivoted positions.

15. The aircraft of claim 1, further comprising at least one of a payload or a landing gear attached to said fuselage.

16. The aircraft of claim 1, wherein the crossbeam is rotatable with respect to the fuselage and independent of the longitudinal beams.

* * * * *